US008858902B2

(12) United States Patent
Copenhafer

(10) Patent No.: US 8,858,902 B2
(45) Date of Patent: Oct. 14, 2014

(54) SELECTIVE REMOVAL OF SULFIDE FROM AQUEOUS ALKALI SOLUTIONS

(71) Applicant: FMC Wyoming Corporation, Philadelphia, PA (US)

(72) Inventor: William C. Copenhafer

(73) Assignee: FMC Wyoming Corporation, Philadelphia, PA (US)

(*) Notice: Subject to any disclaimer, the term of this patent is extended or adjusted under 35 U.S.C. 154(b) by 0 days.

(21) Appl. No.: 13/896,503

(22) Filed: May 17, 2013

(65) Prior Publication Data
US 2013/0248462 A1 Sep. 26, 2013

Related U.S. Application Data

(62) Division of application No. 13/407,258, filed on Feb. 28, 2012, now Pat. No. 8,454,840.

(51) Int. Cl.
C01B 17/00 (2006.01)
C01D 7/10 (2006.01)
C01D 7/30 (2006.01)
C02F 1/72 (2006.01)
C01D 7/24 (2006.01)

(52) U.S. Cl.
CPC . C02F 1/722 (2013.01); C01D 7/10 (2013.01); C01D 7/30 (2013.01); C01D 7/24 (2013.01)
USPC ........ 423/182; 423/183; 423/206.2; 210/759; 166/244.1; 299/2; 299/16

(58) Field of Classification Search
USPC ................ 210/759; 423/182, 183, 206.2; 166/244.1; 299/2–5, 16; 23/302 T
See application file for complete search history.

(56) References Cited

U.S. PATENT DOCUMENTS

| | | | |
|---|---|---|---|
| 2,032,727 A | 3/1936 | Sundstrom et al. | |
| 2,784,056 A | 3/1957 | Wiseman | |
| 3,211,519 A | 10/1965 | Roberts et al. | |
| 3,705,098 A | 12/1972 | Shepherd et al. | |
| 3,717,698 A | 2/1973 | Ilardi et al. | |
| 3,966,450 A | 6/1976 | O'Neill et al. | |
| 4,108,722 A | 8/1978 | Stover | |
| 4,151,260 A | 4/1979 | Woertz | |
| 4,163,044 A | 7/1979 | Woertz | |
| 4,285,915 A | 8/1981 | Saldick et al. | |
| 4,291,002 A | 9/1981 | Arnold et al. | |
| 4,361,487 A | 11/1982 | Hills et al. | |
| 4,552,668 A | 11/1985 | Brown et al. | |
| 4,574,076 A | 3/1986 | Castrantas | |
| 4,839,154 A | 6/1989 | Allison et al. | |
| 4,869,882 A | 9/1989 | Dome et al. | |
| 5,043,149 A | 8/1991 | Frint et al. | |
| 5,126,118 A | 6/1992 | Hardison | |
| 5,246,597 A * | 9/1993 | Jenson et al. | 210/754 |
| 5,262,134 A | 11/1993 | Frint et al. | |
| 5,283,054 A | 2/1994 | Copenhafer et al. | |
| 5,302,361 A | 4/1994 | Nagl | |
| 5,575,922 A | 11/1996 | Green et al. | |
| 5,618,504 A | 4/1997 | Delling et al. | |
| 5,766,270 A | 6/1998 | Neuman et al. | |
| 5,955,043 A | 9/1999 | Neuman et al. | |
| 6,022,516 A | 2/2000 | Copenhafer et al. | |
| 6,126,702 A | 10/2000 | Liu et al. | |
| 6,207,123 B1 | 3/2001 | Tanaka et al. | |
| 6,228,335 B1 | 5/2001 | Copenhafer et al. | |
| 6,576,206 B2 | 6/2003 | Copenhafer et al. | |
| 6,589,497 B2 | 7/2003 | Smith | |
| 7,018,594 B2 | 3/2006 | Copenhafer | |
| 7,628,109 B2 | 12/2009 | Feygelman et al. | |
| 7,638,109 B2 | 12/2009 | Copenhafer | |
| 7,645,435 B2 | 1/2010 | Braman et al. | |
| 7,883,626 B2 | 2/2011 | Sharkey et al. | |
| 2002/0009409 A1 | 1/2002 | Copenhafer et al. | |
| 2010/0066153 A1 | 3/2010 | Day et al. | |
| 2010/0140186 A1 | 6/2010 | Huang et al. | |
| 2011/0030586 A1 | 2/2011 | Constantz et al. | |

FOREIGN PATENT DOCUMENTS

FR 1470336 12/1965

OTHER PUBLICATIONS

Bull, et al. "Supported Catalysts in Hazardous Waste Tratment" ACS Symposium Series, vol. 422, 1990, pp. 52-66.
FMC Technical Brochure "Hydrogen Peroxide Technical Bulletin", 2002, 30 pages.
FMC Technical Bulletin "Environmental Applications for Hydrogen Peroxide", 1993, 20 pages.
FMC Technical Memo "Use of Hydrogen Peroxide for the Oxidation of Sulfur Chemical Wastes", 11 pages.
Kibbel, et al. Hydrogen Peroxide for Industrial Pollution Control—Industrial Wastes, 1972, pp. 824-839.

* cited by examiner

Primary Examiner — Steven Bos
(74) Attorney, Agent, or Firm — FMC Corporation

(57) ABSTRACT

A method for removing sulfide from an aqueous alkali solution in which hydrogen peroxide is introduced into a sulfide-containing aqueous alkali solution associated with an alkali mineral recovery operation. The method is particularly useful for the processing of sulfide-containing aqueous alkali solutions containing $NaHCO_3$ and $Na_2CO_3$, where bicarbonate in the sulfide-depleted alkali solution is decomposed to form $Na_2CO_3$, with concurrent evolution of gaseous carbon dioxide byproduct but without formation of gaseous $H_2S$ as a pollutant, and where $Na_2CO_3$ values are subsequently recovered from the sulfide-depleted carbonate-rich alkali solution via a crystallization operation.

11 Claims, 3 Drawing Sheets

SELECTIVE REMOVAL OF SULFIDE FROM AQUEOUS ALKALI SOLUTIONS

FIELD OF THE INVENTION

The present invention relates to the removal of sulfide from aqueous alkali solutions and more particularly to the selective removal of sulfide from aqueous solutions containing sodium carbonate and sodium bicarbonate, e.g., from sulfide-containing solutions obtained from solution mining of trona ore deposits.

BACKGROUND OF THE INVENTION

Sodium carbonate ($Na_2CO_3$), also called soda ash, is an important, high volume chemical produced in the United States and used in the manufacture of glass, chemicals, soaps and detergents, and aluminum, as well as in textile processing, petroleum refining and water treatment, among many other uses.

In the United States, almost all sodium carbonate is obtained from subterranean deposits of naturally-occurring trona ore. The largest known trona ore deposits in the United States are located in the Green River Basin in southwestern Wyoming, mostly in Sweetwater County, Wyoming, and are typically about 800 to 3000 feet below ground level.

Trona ore consists primarily (80-95 wt %) of sodium sesquicarbonate ($Na_2CO_3 \cdot NaHCO_3 \cdot 2H_2O$), and lesser amounts of sodium chloride (NaCl), sodium sulfate ($Na_2SO_4$), organic matter, and insolubles such as clay and shales. A typical analysis of crude trona ore being mined at Green River, Wyo. is as follows:

| Constituents | Weight Percent |
| --- | --- |
| sodium sesquicarbonate | 90 |
| sodium chloride (NaCl) | 0.1 |
| sodium sulfate ($Na_2SO_4$) | 0.02 |
| organic matter | 0.3 |
| insolubles (clay and shales) | 9.6 |

Trona ore may be recovered from subterranean deposits, for further processing into soda ash, by mechanical mining techniques or by any of several various solution mining methods. The Green River trona ore deposits are presently being commercially mined both by mechanical mining and by solution mining processes.

Mechanical mining, also called dry mining, is carried out underground in the ore beds by mining crews and includes room-and-pillar and long wall methods. Mechanical mining methods are relatively costly and leave unrecovered a significant fraction of the trona ore in the beds being mined, so solution mining processes present an economical alternative to mechanical mining.

Solution mining utilizes conventional well drilling technology and involves injecting water or other aqueous-based mining solvent, via a drilled well hole, into a deposit of trona ore; allowing the mining solvent to dissolve soluble ore; pumping the resulting mining solution (mine water) via a drilled well hole to the surface; and processing the mine water to recover dissolved ore values from the solution in the form of sodium carbonate or other related sodium-based chemicals. Solution mining methods may also be employed for recovering alkali values from depleted ore deposits that have previously been mechanically mined and abandoned.

An alkali solution from solution mining of a $NaHCO_3$-containing ore deposit such as trona typically contains dissolved sodium carbonate and sodium bicarbonate, as well as dissolved organic and inorganic impurities solubilized from the ore deposit. The sodium carbonate values in such alkali solutions are normally recovered as soda ash by various crystallization processes, and the impurities present in the alkali solution are typically removed via a purge stream of crystallizer mother liquor, which is discarded.

Alkali solutions containing $Na_2CO_3$ and $NaHCO_3$ values may obtained not only via solution mining of $NaHCO_3$-containing subterranean ore deposits but also from surface alkali brine lakes or alkali waste ponds. Numerous processes for recovering sodium carbonate and/or sodium bicarbonate from such alkali solutions are disclosed in the prior art. Only a few of these prior art processes mention that sulfide, in addition to sulfates, may be present as a contaminant in the alkali solution.

U.S. Pat. No. 2,784,056 of Wiseman (Stauffer Chemical) issued Mar. 5, 1957 describes a process for recovering sodium bicarbonate from naturally-occurring complex brines located at Searles Lake, Calif. The '056 patent discloses that the brines contain sodium sulfide and that the sulfide is released as hydrogen sulfide during carbonation of such brines. U.S. Pat. No. 4,291,002 of Arnold et al. (Kerr-McGee) issued Sep. 22, 1981 describes a process for recovering soda ash from Searles Lake brines or from artificial brines such as a burkeite solution ($Na_2CO_3$ and $Na_2SO_4$ double salt), via carbonation of such brines to make a sodium bicarbonate intermediate, which is then recrystallized as sodium carbonate.

U.S. Pat. No. 4,869,882 of Dome et al. (General Chemical) issued Sep. 26, 1989 describes a process for recovering soda ash from waste or storage ponds associated with a soda ash manufacturing facility, via neutralization of the alkali waste water with lime to convert bicarbonate to carbonate, evaporation, and then crystallization of sodium carbonate decahydrate, which is recovered. The process is described as being useful for recovery of soda ash values from alkali waste water having a high sulfate content.

U.S. Pat. No. 5,262,134 of Frint et al. (FMC) issued Nov. 16, 1993 describes a process for recovering sodium carbonate values from mining liquor obtained from solution mining of subterranean trona ore deposits, via sequential crystallizations of sodium sesquicarbonate and sodium carbonate decahydrate, the latter then being recrystallized as sodium carbonate monohydrate. The Frint '134 patent contains a detailed description of various prior art trona ore solution mining techniques and of the "sesquicarbonate" and "monohydrate" soda ash recovery processes applicable to dry-mined trona ore, and those disclosures of U.S. Pat. No. 5,262,134 are hereby incorporated by reference into the present specification.

U.S. Pat. No. 5,575,922 of Green et al. (Solvay) issued Nov. 19, 1996 describes a process for treating mine water from an underground trona mine with caustic soda, to raise the pH of the mine water to 11.5 to 14, to convert $NaHCO_3$ in the mine water into $Na_2CO_3$ and remove some of the impurities. Green et al. '922 notes that the mine water may also include impurities such as chlorides, sulfides, sulfites, sulfates, iron pyrite from shale insolubles and dissolved organic compounds. The patent also states that the caustic soda treatment, at preferred pH values above 12.5, significantly reduces sulfide odor in the mine water.

Numerous soda ash recovery processes have been described in the patent literature for treating alkali solutions obtained from solution mining, and many include a step of decomposing sodium bicarbonate in the alkali solution, with the concurrent evolution of gaseous carbon dioxide, to covert the bicarbonate into sodium carbonate.

U.S. Pat. No. 5,283,054 of Copenhafer et al. (FMC) issued Feb. 1, 1994 describes a process for recovering sodium carbonate from aqueous mining solution obtained from solution mining of subterranean trona deposits. The process first converts sodium bicarbonate present in the aqueous mining solution to sodium carbonate, via evaporation and $CO_2$ stripping, followed by neutralization with lime to decompose residual sodium bicarbonate in the evaporated solution. An intermediate product, sodium carbonate decahydrate, is crystallized from the $NaHCO_3$-depleted solution and recovered, then redissolved and recrystallized as sodium carbonate monohydrate. The soda ash recovery process of the Copenhafer '054 patent is sometimes referred to as the Evaporation, Lime, Decahydrate, Monohydrate (ELDM) process.

Other soda ash recovery processes, analogous to the ELDM process, have been described in subsequent patents for recovery sodium carbonate values from alkali solutions.

U.S. Pat. No. 5,766,270 of Neuman et al. (Tg Soda Ash) issued Jun. 16, 1998 and U.S. Pat. No. 5,955,043 of Neuman et al. (Tg Soda Ash) issued Sep. 21, 1999 each describe processes for recovering sodium carbonate from dilute solution mining brines. In Neuman et al. '270, the sodium bicarbonate content of the mining brine is first lowered, via steam stripping, followed by crystallization of sodium carbonate decahydrate. In Neuman et al. '043, the bicarbonate content of the mining brine is first lowered, via neutralization with caustic soda or dilution, followed by crystallization of sodium carbonate decahydrate. Residual bicarbonate in the decahydrate mother liquor is removed via steam stripping.

Other patents and published patent applications that describe soda ash recovery processes that utilize alkali solutions from solution mining or from dissolution of mined trona ore and that have a unit operation or step that involves conversion of bicarbonate to carbonate, e.g., via steam stripping, include U.S. Pat. No. 6,228,335 of Copenhafer et al. issued May 8, 2001; U.S. Pat. No. 6,576,206 of Copenhafer et al. issued Jun. 10, 2003; U.S. Pat. No. 6,589,497 of Smith issued Jul. 8, 2003; U.S. Pat. No. 7,645,435 of Braman et al. issued Jan. 12, 2010; and U.S. Patent Application Publication No. 2010/0066153 of Day et al. dated Mar. 18, 2010.

Although many of the above-noted references mention sulfates as being present in solution mining liquor, only a few mention the presence of sulfide and none of these describe treatment methods for the specific removal of sulfides.

Hydrogen peroxide has long been recognized as a useful oxidizing agent in industrial applications, and the patent and technical literature disclose such applications. Some of these are directed to abatement of sulfide as a pollutant in aqueous media and gas streams.

Kibbel et al., in "Hydrogen Peroxide for Industrial Pollution Control," *Industrial Wastes*, November/December 1972, pp. 824-839, describe the use of hydrogen peroxide for treatment of sulfide pollutants in a variety of industrial wastes, including sulfide present in NaCl brines.

U.S. Pat. No. 3,705,098 of Shepherd et al. (FMC) issued Dec. 5, 1972 describes a process for controlling sulfide and hydrogen sulfide in sewage using hydrogen peroxide. U.S. Pat. No. 3,966,450 of O'Neill et al. (FMC) issued Jun. 29, 1976 describes a process for controlling odor in an animal waste slurry using hydrogen peroxide.

U.S. Pat. No. 3,717,698 of Ilardi et al. (FMC) issued Feb. 20, 1973 describes a process for removing organic impurities in the monohydrate soda ash process, using hydrogen peroxide activated with sodium persulfate. The hydrogen peroxide is employed in an amount sufficient to yield active oxygen equivalent stoichiometrically to the organic impurities in the solution, and the amount of sodium persulfate employed is from one-sixth to one-half of the weight of the hydrogen peroxide.

U.S. Pat. No. 4,163,044 of Woertz (Union Oil) issued Jul. 31, 1979 describes a process for treating $H_2S$-containing geothermal steam obtained during a drilling operation to reduce the hydrogen sulfide content of the steam, by employing a gas absorption process that uses aqueous sodium hydroxide or calcium hydroxide as the aqueous alkaline absorption solution to produce $H_2S$-depleted steam. Following the $H_2S$-absorption step, at least a portion of the aqueous, alkaline solution containing absorbed $H_2S$ is treated with hydrogen peroxide to effect a reduction in the sulfide content of the solution. The treated alkaline solution is then heated and recycled for further use as alkaline absorption solution that is contacted with the $H_2S$-containing steam.

U.S. Pat. No. 4,361,487 of Hills et al. (FMC) issued Nov. 30, 1982 describes a process for removing hydrogen sulfide from the condensate of spent steam in a geothermal power plant by oxidizing such hydrogen sulfide to elemental sulfur using a peroxygen compound, preferably hydrogen peroxide, in the presence of a vanadate catalyst under neutral to alkaline conditions. The vanadate catalyst, preferably aqueous sodium vanadate, is added after the steam condensate is adjusted to pH 7 or higher with an alkaline reagent, and the peroxygen is introduced after the vanadate catalyst has been added to the pH-adjusted condensate. The Hills et al. '487 patent states that the presence of the vanadate catalyst serves to increase the efficiency of the oxidation of hydrogen sulfide to elemental sulfur by hydrogen peroxide and that the hydrogen peroxide also serves to regenerate the vanadate ion.

U.S. Pat. No. 4,552,668 of Brown et al. (FMC) issued Nov. 12, 1985 describes the use of hydrogen peroxide with free radical scavengers in viscous (polymer-thickened) aqueous well treatment fluids intended for subterranean petroleum production operations, to react with sulfide in such fluids.

U.S. Pat. No. 4,574,076 of Castrantas (FMC) issued Mar. 4, 1986 describes the removal of hydrogen sulfide from geothermal steam before the latter is released into the atmosphere, using aqueous alkaline hydrogen peroxide injected into the steam gas stream to oxidize the hydrogen peroxide.

U.S. Pat. No. 4,839,154 of Allison et al. (Conoco) issued Jun. 13, 1989 describes a process for converting sulfide into innocuous sulfur species, in oil field-produced water, using an oxidizing agent such as chlorine, hypochlorite, hydrogen peroxide, chlorine dioxide sulfur dioxide or ozone in combination with a surface active agent.

U.S. Pat. No. 7,883,626 of Sharkey, Jr. et al. (Waterways Restoration) issued Feb. 8, 2011 describes the neutralization of acid mine drainage (e.g., from coal or metal mining operations) derived from the oxidation of sulfide minerals (e.g., iron sulfide in coal regions), exposed to water and oxygen, to form acidic, iron and sulfate-rich drainage. Sharkey, Jr. et al. '626 utilizes a multi-component formulation containing a neutralizer/binder component, a dissolution control/filtration component, an oxidizing agent and a dispersant/neutralizer component. The oxidizing component may be calcium peroxide, potassium permanganate, or hydrogen peroxide.

The present invention provides a method for the targeted and efficient oxidation of sulfides present in sulfide-containing alkali solutions using hydrogen peroxide to form soluble reaction products. The method is particularly useful for the removal of sulfide from $NaHCO_3$-containing alkali solutions that are subsequently processed to convert such $NaHCO_3$ into $Na_2CO_3$ via steam stripping or evaporation, since the sulfide would otherwise be volatilized as hydrogen sulfide ($H_2S$) along with the gaseous $CO_2$ byproduct of the bicarbonate decomposition reaction.

BRIEF SUMMARY OF THE INVENTION

In accordance with the present invention, sulfide is removed from an aqueous alkali solution in a method introducing hydrogen peroxide into a sulfide-containing aqueous alkali solution associated with an alkali mineral recovery operation to oxidize the soluble sulfide to a soluble reaction product.

Another embodiment of the present invention is a method for processing an aqueous alkali solution contaminated with sulfide comprising introducing hydrogen peroxide into a sulfide-containing aqueous alkali solution containing $NaHCO_3$ and $Na_2CO_3$ to oxidize the soluble sulfide to a soluble reaction product; decomposing $NaHCO_3$ in the sulfide-depleted alkali solution to form $Na_2CO_3$, with concurrent evolution of gaseous carbon dioxide; and recovering $Na_2CO_3$ values from the sulfide-depleted $Na_2CO_3$-enriched alkali solution via a crystallization operation.

DETAILED DESCRIPTION OF THE INVENTION

Overview of Invention

Figure 1:
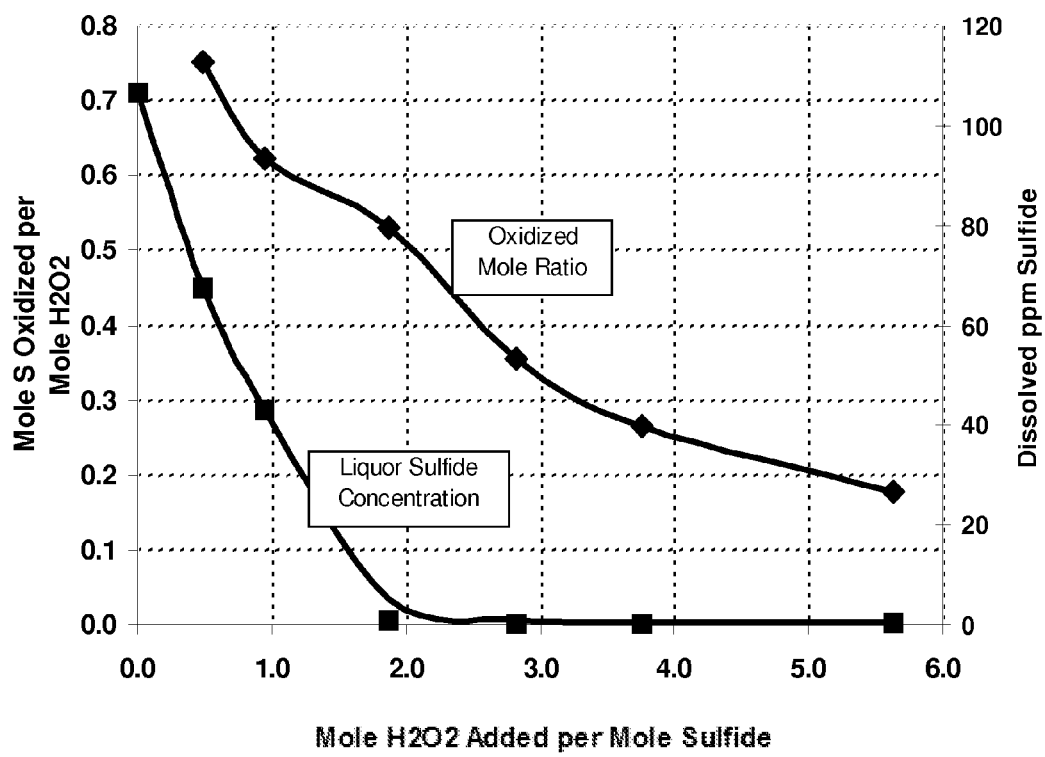
FIG. 1 shows in graphical form the results of a first study described in Example 1, in which varying amounts of hydrogen peroxide were used to treat a sulfide-containing alkali mining solution. The sulfide reductions achieved in the $H_2O_2$-treated alkali solution (measured both as ppm $S^{-2}$ and as moles $S^{-2}$ oxidized per mole $H_2O_2$) are plotted against the amounts of hydrogen peroxide added (moles $H_2O_2$ per mole $S^{-2}$).

The present invention provides an efficient and highly effective method for removing solubilized sulfide that is present in aqueous alkali solutions as a contaminant, e.g., in sulfide-contaminated $Na_2CO_3$- and $NaHCO_3$-containing aqueous alkali solutions. The invention employs hydrogen peroxide to achieve targeted and selective oxidation of the sulfide contaminant of the aqueous alkali solutions, with the sulfide oxidation reaction product remaining solubilized in the treated alkali solution.

The hydrogen peroxide used in this method is equally efficient at treating a wide range of sulfide concentrations, e.g., low concentrations such as 3-10 ppm $S^{-2}$ as well as high concentrations in excess of 500-1000 ppm $S^{-2}$. The invention is capable of yielding a treated alkali solution that is essentially sulfide free, i.e., containing less than about 1 ppm $S^{-2}$.

The present invention is particularly useful for treating $Na_2CO_3$- and $NaHCO_3$-containing sulfide-contaminated alkali solutions that are subsequently processed to convert the sodium bicarbonate content to sodium carbonate, e.g., via steam stripping or evaporation of water, releasing gaseous carbon dioxide ($CO_2$) and water vapor ($H_2O$). The invention, by oxidizing sulfide in the $H_2O_2$-treated alkali solution, provides a means for avoiding unwanted volatilization of soluble sulfide as hydrogen sulfide ($H_2S$), an undesirable air pollutant and contaminant, in the gaseous carbon dioxide byproduct of the $NaHCO_3$-conversion reaction.

Technical Problem

Impurities in aqueous alkali solutions obtained from dissolution of alkali minerals such as trona and nahcolite ores (either mechanically-mined ore or solution-mined ore) are inevitably present, given that the ores contain various minor components normally considered to be impurities, e.g., sulfate and chloride salts and organic components in the case of trona ore that become solubilized along with sodium carbonate and sodium bicarbonate from the ore's sodium sesquicarbonate component.

A traditional approach for dealing with such solubilized impurities in aqueous alkali solutions, in crystallization-based soda ash recovery processes like the monohydrate and sesquicarbonate processes, is to purge a portion of the crystallizer mother liquor to prevent the accumulation of impurities in recycled crystallizer mother liquor.

The presence of soluble sulfide as an additional impurity in aqueous alkali solutions adds a complicating factor in the subsequent processing of such solutions. Many soda ash recovery processes that utilize $Na_2CO_3$- and $NaHCO_3$-containing alkali solutions require the conversion of bicarbonate to carbonate, e.g., via heating or steam stripping or evaporation, to facilitate the downstream crystallization of the desired $Na_2CO_3$ species, e.g., sodium carbonate monohydrate or sodium carbonate decahydrate.

Decomposition of solubilized sodium bicarbonate to sodium carbonate via heating or steam stripping or evaporation results in the formation of byproducts carbon dioxide and water, both of which are typically evolved as gaseous byproducts. The presence of even minor concentrations of soluble sulfide in such $Na_2CO_3$- and $NaHCO_3$-containing alkali solutions also results in the concurrent evolution and release of the soluble sulfide as gaseous hydrogen sulfide ($H_2S$), an undesirable gaseous byproduct that contaminates the $CO_2$ gas stream and that is normally considered an air pollutant, even at relatively low concentrations. The $H_2S$-contaminated gas stream must normally be treated to remove the gaseous hydrogen sulfide contaminant regardless of whether the carbon dioxide is recovered for reuse or the $CO_2$-containing gas stream is released into the atmosphere.

Hydrogen sulfide is a colorless gas that is well-known for its characteristic "rotten eggs" odor, which is detectable even at very low concentrations, e.g., 1 ppm (volume) $H_2S$ or less. Hydrogen sulfide at high concentrations, usually associated with accidental releases, is poisonous and can be lethal. At low $H_2S$ concentrations, there may be adverse health effects from long-term exposure. Although there is no federal ambient air quality standard for hydrogen sulfide, many states in the U.S. have air quality regulations for hydrogen sulfide levels.

Traditional prior art processes treat $H_2S$-contaminated gas streams by removal of the contaminant via wet scrubbing in a gas absorption column (also called a gas scrubber) using a liquid absorption medium containing a alkaline reactant (e.g., sodium hydroxide or particulate lime in suspension) or dry scrubbing using a particulate solid as the reagent. These gas scrubbing techniques typically react the reagent with the gaseous $H_2S$ to form a sulfite or sulfate byproduct. Obvious drawbacks to this sulfide control approach, involving removal of gaseous hydrogen sulfide from high volume gas streams, are the high capital cost and raw materials (reagent) cost.

The sulfide content of the sulfide-containing aqueous alkaline solutions treated according to this invention may originate from a variety of different sources. Aqueous alkaline solutions obtained from subterranean environments often contain sulfide that originates from microbial activity.

Sulfides, including hydrogen sulfide and sulfide salts, are believed to be formed in subterranean aqueous environments that are in contact with sulfate-containing ores (or petroleum deposits) by the activity of sulfate- or sulfur-reducing microorganisms, particularly anaerobic bacteria, which are naturally present in water and soil. Such aqueous environments are frequently encountered in recovery of alkali minerals. For example, the solution mining of trona or nahcolite ores with aqueous mining solvents injected into the ore deposits (which normally contain soluble sulfates as impurities) produces aqueous alkali solutions containing $Na_2CO_3$ and $NaHCO_3$ as well as other solubilized impurities, including sulfides.

Particularly problematic microorganisms are believed to be *Desulfovibrio* and *Desulfotomaculum* bacterial species, which convert sulfur or sulfates present in such (largely anaerobic) aqueous environments into sulfides, e.g., hydrogen sulfide at acidic pH levels. These gram negative bacteria include *Desulfovibrio* species like *Desulfovibrio desulfuricans* and *Desulfovibrio salexigens*, and *Desulfotomaculum* species like *Desulfotomaculum nigrificans*. Such bacteria not only require a sulfur source to remain active, but also a carbon source, which is provided by the bicarbonate and carbonate which is present in trona or nahcolite ore deposits.

Sulfate-reducing bacteria are normally sessile bacteria, i.e., they attach themselves to solid surfaces, as opposed to being free-floating in the aqueous fluid. In addition, sulfate-reducing bacteria are generally found in combination with slime-forming bacteria, in films consisting of a biopolymer matrix embedded with bacteria. The interior of these biofilms is anaerobic, which is highly conducive to the growth of sulfate-reducing bacteria even if the surrounding environment is aerobic. As such, these problematic bacteria are difficult to control with biocides that may be conventionally added to the aqueous medium that is injected into a subterranean, solution-mined ore deposit to form an alkali solution for recovery.

Consequently, soluble sulfide formation in aqueous alkali solutions is not easily or economically treated via introduction of biocides into the aqueous mining solvent, which is injected in very large volumes into the subterranean ore deposit and tends to remain in the ore deposit cavity for long periods of time before the resultant alkali solution is withdrawn from the cavity.

Advantages of Invention

The method of present invention provides several unexpected advantages and benefits in its removal of sulfide from sulfide-contaminated aqueous alkali solutions using hydrogen peroxide.

The oxidation of the sulfide-containing alkali solutions with hydrogen peroxide in the present invention is targeted, with the peroxide selectively oxidizing the sulfide in such solutions without concurrently oxidizing other soluble components, e.g., solubilized organic impurities, that may also be present in the solution. This targeted selectivity for the soluble sulfide is evident even when an excess of hydrogen peroxide reactant is employed.

The peroxide oxidation of the sulfide-containing alkali solutions in the present invention also operates with unexpectedly high utilization efficiency of the hydrogen peroxide reactant. The method of this invention is capable of effecting essentially complete removal of the soluble sulfide in alkali solutions, yielding less than about 1 ppm $S^{-2}$ in the $H_2O_2$-treated solution, with as little as two moles $H_2O_2$ per mole $S^{-2}$, in contrast to prior art reports that indicate that four moles of $H_2O_2$ are required for stoichiometric reaction of one mole of sulfide to soluble sulfate.

In addition, another unexpected benefit of the sulfide removal method of this invention is the absence of a solid as the oxidation reaction product. No colloidal (solid) sulfur appears to be formed in the hydrogen peroxide treatment of sulfide-containing alkali solutions in this invention. This characteristic, the absence of a solid reaction product, is a significant advantage since solid oxidation products can complicate or interfere with subsequent processing of the treated alkali solution. The oxidation products of the reaction between hydrogen peroxide ($H_2O_2$) and the soluble sulfide ($S^{-2}$) appear to be water ($H_2O$) and soluble sulfide-derived reaction products, which remain in the treated alkali solution and are not precipitated.

A further advantage of this invention is that use of hydrogen peroxide as the oxidizing agent to control sulfide in sulfide-containing alkali solutions does not introduce an undesirable component into the alkali solution, particularly when a excess of the oxidizing agent is employed, unlike the case with some prior art procedures and reagents used for sulfide control. Excess hydrogen peroxide reagent does not introduce an unwanted species into the treated alkali solution, since decomposition of excess $H_2O_2$ results in water ($H_2O$) and oxygen ($O_2$), normally considered to be innocuous byproducts.

Another benefit of this invention is that the oxidation of the sulfide-containing alkali solutions with hydrogen peroxide does not require adjustment of either the solution pH or the temperature of the aqueous alkali solution being treated. The sulfide-containing aqueous alkali solutions employed in this invention are typically obtained, in large volumes, from subterranean mining operations or from surface-located alkaline ponds or lakes. Advantageously, the sulfide removal method of this invention using hydrogen peroxide is readily adapted to the treatment of such large-volume alkali solutions as obtained, without need for a preliminary heat exchange step for temperature adjustment and without need for solution pH adjustment.

Yet another unexpected benefit of this invention is that the oxidation of the sulfide-containing alkali solutions with hydrogen peroxide is highly efficient and rapid, even without the addition of peroxide activating agents which are sometimes utilized with peroxides to catalyze a peroxide oxidation reaction. Although peroxide activators such as transition metals may optionally be used in the method of this invention, experimental studies have shown that their addition is not necessary to catalyze or otherwise promote efficient oxidation of the sulfide in alkali solutions with the hydrogen peroxide.

In embodiments of the present invention that involve further processing of sulfide-depleted alkali solutions containing $Na_2CO_3$ and $NaHCO_3$, the sulfide removal method of this invention avoids the need for an air pollution control step, for treating volatilized hydrogen sulfide ($H_2S$), where the alkali solution is subsequently processed to decompose $NaHCO_3$ into $Na_2CO_3$ to enrich the alkali solution for crystallization of its $Na_2CO_3$ values.

The hydrogen peroxide oxidation of sulfide-containing alkali solutions in the present invention is capable of removing essentially all sulfide from the $H_2O_2$-treated alkali solution. Consequently, unwanted volatilization of the sulfide as $H_2S$ from $Na_2CO_3$- and $NaHCO_3$-containing alkali solutions is readily avoided, when such solutions are subsequently processed to convert soluble bicarbonate to carbonate, via heating, steam stripping or evaporation, releasing gaseous carbon dioxide ($CO_2$) and water vapor ($H_2O$).

These and other advantages and benefits of the present invention will be apparent in the more detailed discussion of this invention which follows.

Alkali Solutions

The aqueous alkali solutions suitable for use in the present invention have several noteworthy characteristics. First, the alkali solutions contain, or are contaminated with sulfide ($S^{-2}$) that is present as a solubilized species. The amount of sulfide in the sulfide-containing alkali solution may be relatively small. e.g., with the solution having a concentration as low as 3-10 ppm $S^{-2}$, or may be present in moderate concentrations or even high concentrations, e.g., the latter being in excess of 500-1000 ppm $S^{-2}$.

The sulfide-containing aqueous alkali solutions of this invention are also characterized by having an alkaline pH value, i.e., a pH value in excess of 7, typically in the range of in excess of pH 7 up to about pH 12.

The sulfide-containing aqueous alkali solutions employed in the present invention may be obtained from a variety of different alkali sources, each typically associated directly or indirectly with the recovery of alkali values, such as soda ash or sodium bicarbonate, from natural sources.

Suitable sulfide-containing alkali solutions for use in this invention include aqueous solutions containing dissolved sodium carbonate, or dissolved sodium bicarbonate, or both sodium carbonate and sodium bicarbonate.

The sulfide-containing aqueous alkali solutions may be obtained directly from (or indirectly derived from) subterranean alkali mineral ore deposits (i) that contain $NaHCO_3$- and $Na_2CO_3$-bearing minerals, e.g., trona (primarily sodium sesquicarbonate, $Na_2CO_3.NaHCO_3.2H_2O$), wegscheiderite (primarily $Na_2CO_3.3NaHCO_3$), or (ii) that contain primarily $NaHCO_3$, e.g., nahcolite (primarily $NaHCO_3$). Combinations of these $NaHCO_3$- and $Na_2CO_3$-containing minerals may be present in the same deposit or formation.

The sulfide-containing aqueous alkali solutions may be obtained from solution mining of such subterranean ore deposits or from solution mining of previously-mined (dry or mechanical mining) ore deposits or even from dissolution of dry-mined ore into an aqueous medium. The aqueous alkali solutions employed in the present invention are preferably, but not necessarily, obtained from solution mining of subterranean trona ore deposits or other $NaHCO_3$-containing ore deposits, using solution mining solvents (e.g., water or recycled aqueous streams dilute in dissolved alkali values) and solution mining techniques that are well known in the alkali solution mining art.

Alkali solution(s) or aqueous alkali solution(s), as the terms are used herein with reference to solution mining, refer to the aqueous solution or alkali mining solution or brine that is withdrawn or otherwise recovered from a subterranean alkali source, e.g., an alkali ore deposit being solution mined, as contrasted with a "mining solvent" or "mining solution" that is introduced via solution mining techniques into contact with the subterranean ore deposit to effect dissolution of the soluble portions of the ore and thereby produce the aqueous alkali solution.

The sulfide-containing aqueous alkali solutions may also be obtained from (i) waste or holding ponds employed in conjunction with surface operations for soda ash manufacturing, e.g., alkali-containing ponds that hold soda ash process waste streams, e.g., mother liquor purged from soda ash crystallization operations, or other aqueous waste or byproduct streams from soda ash manufacturing, or (ii) from waste water ponds or streams containing waste water recovered or pumped from the subterranean location of conventional mechanical mining operations, e.g., dust suppression water or cooling water. Such sulfide-containing aqueous alkali waste, purge or byproduct streams may also be treated directly, in the method of this invention, without first being stored in holding ponds. These aqueous alkali solutions typically contain significant levels of impurities, e.g., sulfate or chloride, in addition to the sulfide impurity treated in the method of this invention, as compared with alkali solutions obtained directly from solution mining operations.

The sulfide-containing aqueous alkali solutions may also be obtained from a tailings disposal system associated with a soda ash manufacturing facility, in which dry-mined ore waste solids, i.e., tailings, are introduced as an aqueous slurry into a subterranean cavity and an alkali solution is subsequently withdrawn from the cavity for recovery of soda ash, such as described in U.S. Pat. No. 5,043,149 of Frint et al. issued Aug. 27, 1991.

The sulfide-containing aqueous alkali solutions may also be alkaline brines that are obtained from naturally-occurring surface brine lakes or surface alkali lakes, e.g., Searles Lake, Owens Lake or Mono Lake in California.

The sulfide-containing aqueous alkali solutions employed in this invention are typically subjected to further processing to recover their alkali values in the form of a commercially-important product, e.g., soda ash, and the presence of soluble sulfide in such alkali solutions often presents a complicating factor in the further processing of the alkali solutions. This aspect of the present invention is discussed in more detail below.

The sulfide-containing aqueous alkali solutions employed in the present invention preferably contain sodium carbonate and sodium bicarbonate, the latter typically being present at a concentration of at least 1 wt % $NaHCO_3$. The alkali solutions preferably contain at least about 2 wt % $NaHCO_3$ and, more preferably, about 2 wt % to about 8 wt % $NaHCO_3$. (These and other weight percentages in this specification should be understood to mean percentage by weight, based on the total weight of the solution.) It should be recognized that solubilization of sodium bicarbonate, e.g., nahcolite, in an aqueous medium, e.g., a mining solution, typically results in an equilibrated solution that contains not only bicarbonate ($HCO_3^-$) but also some carbonate ($CO_3^{-2}$), particularly at alkaline pH values.

The solubilized sodium carbonate content of the alkali solutions is not critical but is preferably significant, so as to promote efficient recoveries of this alkali. e.g., in a soda ash recovery process in which the sulfide-reduced alkali solution is typically employed. The sodium carbonate content of the aqueous alkali solutions is preferably at least about 6 wt % $Na_2CO_3$ and, more preferably, at least about 10 wt % $Na_2CO_3$.

Alkali solutions containing high $Na_2CO_3$ concentrations, i.e., at least about 10 wt % $Na_2CO_3$ up to a saturation concentration of $Na_2CO_3$, are highly preferred, since such high alkali concentrations promote good recovery efficiencies in the downstream crystallization of the $Na_2CO_3$ values.

Alkali solutions that are essentially equilibrated, saturated solutions (with respect to $NaHCO_3$ and $Na_2CO_3$) and that are obtained from the dissolution of sodium sesquicarbonate in trona ore, using an aqueous medium such as water at 20° C., will contain about 17 wt % $Na_2CO_3$ and about 4 wt % $NaHCO_3$. Small differences in the dissolution solvent temperatures will not significantly change the composition; e.g., the corresponding equilibrated, saturated alkali solution at 30° C. (vs. 20° C. just noted above) will contain about 17 wt % $Na_2CO_3$ and about 4.7 wt % $NaHCO_3$. It should be noted that for trona ore deposits located in Green River, Wyo., the temperature of such subterranean trona deposits typically is within the range of about 20° C. to about 30° C., and the temperature of alkali solutions recovered from solution mining of such deposits will likely be close to these temperatures.

In actual practice, an aqueous alkali solution obtained from solution mining of trona ore or other $NaHCO_3$-containing ore is normally not completely saturated. At 25° C., a representative aqueous alkali solution obtained from solution mining of trona would typically contain about 14 wt % $Na_2CO_3$ and about 4.5 wt % $NaHCO_3$. It should be recognized, however, that more concentrated aqueous alkali solutions may be obtained by employing a heated mining solvent, e.g., heated to a temperature above 50° C., or, alternatively, employing a dilute NaOH-containing aqueous mining solvent, but these approaches typically add significantly to the solution mining operational costs.

The aqueous alkali solution preferably has a total alkali (T.A.) content, determined from its dissolved sodium carbonate and sodium bicarbonate, of at least about 8 wt %. T.A. More preferably, the aqueous alkali solution has a total alkali content of at least about 10 wt %, and, most preferably, at least about 15 wt % T.A. The term "total alkali" refers to the total weight percent in an alkali solution of dissolved sodium carbonate and sodium bicarbonate, the sodium bicarbonate being expressed as its equivalent sodium carbonate content: Percent total alkali (T.A. wt %)=$Na_2CO_3$ (wt %)+[53/84]×[$NaHCO_3$ (wt %)]. For example, an aqueous alkali solution containing 14 wt % $Na_2CO_3$ and 4 wt % $NaHCO_3$ would have a total alkali content of 16.5 wt % $Na_2CO_3$, since 4 wt % $NaHCO_3$ corresponds to 2.5 wt % equivalent $Na_2CO_3$, the conversion factor for the sodium bicarbonate content being [(½)×106 mol. wt. $Na_2CO_3$/84 mol. wt. $NaHCO_3$].

Sulfide Content of the Alkali Solutions

The aqueous alkali solutions employed in the present invention contain sulfide, in addition to their solubilized alkali content, e.g., sodium carbonate and sodium bicarbonate.

The alkali solutions of the present invention typically have an alkaline pH, with the pH value being greater than 7. For this reason, the soluble sulfide that is present in the alkali solution as a contaminant will normally be present as an ionized sulfide salt, e.g., $Na_2S \rightarrow Na^+$ and $S^{-2}$, rather than as $H_2S$ which acts as a weak acid.

The concentration of sulfide in the aqueous alkali solutions employed in this invention may range over a wide concentration range, from as low as about 3 ppm $S^{-2}$ up to 1000 ppm $S^{-2}$ or more (all parts per million referenced herein are by weight).

The method of the present invention is preferably carried out to treat sulfide-containing aqueous alkali solutions containing about 10 ppm $S^{-2}$ to about 500 ppm $S^{-2}$ and, more preferably, containing about 20 ppm $S^{-2}$ to about 300 ppm $S^{-2}$.

In situations where the alkali solutions contain low sulfide concentrations, e.g., as little as 5 ppm $S^{-2}$ or even 3 ppm $S^{-2}$, the method of this invention is nevertheless capable of efficiently reducing such low levels of sulfide contamination to even lower levels, e.g., to less than about 1 ppm $S^{-2}$. Sulfide removal from aqueous alkali solutions that achieves a final sulfide concentration of less than about 1 ppm $S^{-2}$ is considered, for purposes of the present invention, to be essentially complete removal of the sulfide from the treated solution.

There may likewise be situations where the sulfide concentration in an aqueous alkali solution is very high, at least about 300 ppm $S^{-2}$, or even higher, at least 500 ppm $S^{-2}$ or even at least 1000 ppm $S^{-2}$ or more. The hydrogen peroxide treatment of this invention can readily provide adequate control of such high sulfide concentrations, by effecting significant sulfide reductions, removing at least about 50% of the initial (pre-treatment) sulfide content, and can even achieve essentially complete sulfide removal (<1 ppm $S^{-2}$) in such heavily sulfide-contaminated alkali solutions.

The sulfide concentration in sulfide-containing aqueous alkali solutions obtained from solution mining of subterranean trona ore deposits is normally in the range of about 10 ppm $S^{-2}$ to about 150 ppm $S^{-2}$, with typical concentrations being in the range of about 20 ppm $S^{-2}$ to about 120 ppm $S^{-2}$. Higher or lower sulfide concentrations may sometimes be encountered, within the broad ranges noted above.

Sulfide Treatment with Hydrogen Peroxide

The present invention involves the treatment of sulfide-containing aqueous alkali solutions with hydrogen peroxide. The reaction of soluble sulfide ($S^{-2}$) present in the alkali solution with hydrogen peroxide ($H_2O_2$) effects an oxidation of the sulfide into a soluble reaction product, rather than a solid reaction product such as colloidal sulfur. Furthermore, the soluble reaction product of this oxidation reaction is not readily volatilized, unlike the case with soluble sulfide which easily volatilizes from the alkali solution as hydrogen sulfide gas ($H_2S$).

The exact reaction and reaction mechanism occurring between the soluble sulfide and hydrogen peroxide in the present invention are not well understood and do not appear to conform to descriptions of hydrogen peroxide-sulfide reactions described in the prior art.

Kibbel et al., "Hydrogen Peroxide for Industrial Pollution Control," *Industrial Wastes*, November/December 1972 pp. 824-839, discloses that differing amounts of hydrogen peroxide are required to react with sulfide in an aqueous medium depending on the pH of the medium, as follows.

Under neutral pH conditions, hydrogen sulfide in an aqueous medium is believed to react mole-for-mole with hydrogen peroxide to form elemental sulfur:

$$H_2O_2+H_2S \rightarrow 2H_2O+S(s) \qquad (1)$$

The elemental sulfur reaction product is typically present as colloidal sulfur (a solid), giving the aqueous medium a turbid or cloudy appearance.

Under alkaline pH conditions, sulfide in an alkaline aqueous medium is believed to react with hydrogen peroxide to form sulfate, with four moles of hydrogen peroxide being required for each mole of sulfide:

$$4H_2O_2+NaS \rightarrow 4H_2O+Na_2SO_4 \qquad (2)$$

The hydrogen peroxide oxidation of the sulfide-containing alkali solutions in the present invention operates with unexpectedly high utilization efficiency of the hydrogen peroxide reactant. Although prior art reports of hydrogen peroxide stoichiometry (cited above) in the reaction of sulfide with $H_2O_2$ indicate that four moles of $H_2O_2$ are required for complete reaction of one mole of sulfide ($S^{-2}$), the hydrogen peroxide treatment of this invention effects complete reduction of the dissolved sulfide concentration to less than about 1 ppm $S^{-2}$ in alkali solutions with significantly less hydrogen peroxide than 4 moles $H_2O_2$ per mole $S^{-2}$.

The amount of hydrogen peroxide employed in the sulfide removal method of this invention may be as little as 2 moles $H_2O_2$ per mole sulfide ($S^{-2}$), while nevertheless effecting essentially complete removal of sulfide (i.e., less than about 1 ppm $S^{-2}$) in sulfide-containing alkali solutions. The amount of hydrogen peroxide employed in the sulfide removal method of this invention is preferably at least about 2 moles $H_2O_2$ per mole sulfide present in the alkali solution being treated and, more preferably, at least about 3 moles $H_2O_2$ per mole sulfide. The amount of hydrogen peroxide employed is preferably at least about 2 moles $H_2O_2$ to less than about 4 moles $H_2O_2$ per mole sulfide present in the alkali solution being treated.

The amount of hydrogen peroxide employed in the sulfide removal method of this invention is preferably an amount sufficient to reduce the concentration of dissolved sulfide by at least about 50%, more preferably by at least about 70%, and most preferably by at least about 90%, all based on the sulfide concentration of sulfide present in the untreated aqueous alkali solution.

The hydrogen peroxide employed in the sulfide removal method of this invention, particularly where the untreated sulfide-containing aqueous alkali solution contains at least about 20 ppm sulfide, is preferably introduced in an amount sufficient to reduce the content of dissolved sulfide to less than about 10 ppm sulfide. The hydrogen peroxide is more preferably introduced into sulfide-containing aqueous alkali solution in an amount sufficient to reduce the content of dissolved sulfide to less than about 5 ppm sulfide, where the sulfide in the untreated alkali solution is greater than 5 ppm sulfide, e.g., at least about 10 ppm sulfide. Most preferably, the hydrogen peroxide is introduced into sulfide-containing aqueous alkali solution in an amount sufficient to reduce the content of dissolved sulfide to less than about 1 ppm sulfide.

Hydrogen peroxide is well known for its strong oxidizing properties, as exemplified in the reactions noted above. In the present invention, however, the oxidation of the sulfide-containing alkali solutions with hydrogen peroxide appears to be targeted, with the peroxide providing selective oxidation of the sulfide in such solutions. This selective oxidation of sulfide occurs without concurrent oxidation of dissolved or solubilized organic impurities that are also present in the alkali solution. This characteristic of the present invention is all the more noteworthy since this oxidation selectivity for targeting sulfide is evident even when an excess of hydrogen peroxide reactant is employed, as demonstrated by data presented below in Example 1.

The use of hydrogen peroxide to control sulfide in sulfide-containing alkali solutions, in the method of this invention, does not introduce unwanted or contaminating reaction products or byproducts or contaminating unreacted excess reagent, unlike the case with other procedures and reagents for sulfide control. Excess hydrogen peroxide reagent does not introduce an unwanted species into the treated alkali solution, since any reaction with $H_2O_2$ or decomposition of $H_2O_2$ results in water ($H_2O$) as an innocuous byproduct. Furthermore, the byproducts of the desired reaction between $H_2O_2$ and sulfide ($S^{-2}$) are water and soluble sulfide-derived products, which remain in the treated alkali solution and are not precipitated.

Hydrogen Peroxide and $H_2O_2$-Generating Compounds

The removal of sulfide from a sulfide-containing aqueous alkali solution in the present invention is effected with hydrogen peroxide ($H_2O_2$). The hydrogen peroxide employed in this invention is preferably aqueous hydrogen peroxide. The $H_2O_2$ concentration of the aqueous hydrogen peroxide is not critical, but the aqueous hydrogen peroxide is preferably employed as a relatively concentrated solution.

The hydrogen peroxide may alternatively be provided via a $H_2O_2$-generating compound like sodium carbonate peroxide that generates or forms hydrogen peroxide in situ when introduced into an aqueous medium.

Hydrogen peroxide ($H_2O_2$) is a clear colorless liquid that is slightly more dense than water; hydrogen peroxide is a weak acid. Hydrogen peroxide is miscible with water in all proportions, and aqueous hydrogen peroxide solutions are available commercially in a wide range of concentrations.

The hydrogen peroxide utilized in this invention may be utilized in a wide range of concentrations. The aqueous hydrogen peroxide concentrations may range from about 1 wt % $H_2O_2$ to about 50 wt % $H_2O_2$. Dilute to moderate hydrogen peroxide concentrations are preferred, with the more dilute solutions being safer for worker handling of such solutions. The aqueous hydrogen peroxide preferably contains about 1 wt % $H_2O_2$ to about 30 wt % $H_2O_2$ and more preferably about 3 wt % $H_2O_2$ to about 20 wt % $H_2O_2$.

Although relatively safe to handle and feasible for use in this invention, dilute concentrations of aqueous $H_2O_2$ of about 1 wt % $H_2O_2$ to about 8 wt % $H_2O_2$ require relatively larger volumes of aqueous hydrogen peroxide solution to provide the same amount of $H_2O_2$ as provided in smaller volumes of more moderately concentrated aqueous $H_2O_2$ solutions. For this reason, the aqueous hydrogen peroxide is preferably employed as a relatively moderate aqueous hydrogen peroxide solution, e.g., preferably containing at least about 8 wt % $H_2O_2$. Concentrated aqueous hydrogen peroxide solutions of about 30% $H_2O_2$ to about 50 wt % $H_2O_2$ are likewise feasible for use in this invention but require stringent handling and safety measures.

Commercial formulations of aqueous hydrogen peroxide may be used in the present invention, with such formulations being used as-is or diluted to a hydrogen peroxide concentration appropriate for treatment of the sulfide-containing aqueous alkali solution. Relatively concentrated aqueous hydrogen peroxide solutions are available from commercials suppliers, e.g., FMC Corporation (Philadelphia, Pa.) as stabilized solutions.

The amount of hydrogen peroxide required for reaction and removal of the sulfide present in the sulfide-containing aqueous alkali solutions is typically modest in most situations, so concentrated hydrogen peroxide solutions should be well mixed with the sulfide-containing alkali solution being treated to ensure uniform distribution of the $H_2O_2$ reactant throughout the alkali solution.

As noted above, the hydrogen peroxide may alternatively be produced or formed in situ from a hydrogen peroxide-generating compound, e.g., a solid peroxygen compound that is a hydrogen peroxide source. Such hydrogen peroxide-generating solid compounds are characterized by their ability to generate the required hydrogen peroxide, as a decomposition product or the like, when introduced into or when dissolved or otherwise present in an aqueous medium. The $H_2O_2$-generating compound may be introduced into the sulfide-containing aqueous alkali solution directly or premixed in an aqueous medium that is then introduced into the alkali solution being treated.

The hydrogen peroxide-generating peroxygen compounds may be one or more solid peroxygen compounds. Examples include without limitation percarbonates like sodium percarbonate, perborates like sodium perborate, peroxides like sodium, magnesium, calcium, lithium or zinc peroxide, peroxyurea compounds like urea peroxide, persilic acid, hydrogen peroxide adducts of pyrophosphates and phosphates like sodium phosphate perhydrate, and hydrogen peroxide adducts of citrates and sodium silicate, and the like, and mixtures thereof.

Hydrogen Peroxide Activator

A peroxygen activator may optionally be used with the hydrogen peroxide in this invention, to catalyze or otherwise promote efficient oxidation of the hydrogen peroxide with the sulfide and thus provide enhanced hydrogen peroxide reactivity in removing the sulfide from the sulfide-containing aqueous alkali solution being treated. The hydrogen peroxide oxidation of the sulfide-containing alkali solutions in the present invention operates with high utilization efficiency of the hydrogen peroxide reactant, even without the addition of peroxide activators such as transition metals, so use of peroxygen activators is entirely optional.

Use of a peroxygen activator with hydrogen peroxide may be desirable in situations where more rapid reactivity is sought, e.g., where the temperature of the aqueous alkali solution is relatively cool, e.g., below about 10° C., or where other less-than-optimal peroxygen reaction conditions are present.

The peroxygen activator that is optionally used with the hydrogen peroxide, in the present invention, is an element or compound or combination of these that is conventionally used as a hydrogen peroxide activator. Peroxide activators are also sometimes called peroxide catalysts or peroxide initiators. Preferred hydrogen peroxide activators are those that are highly active in catalyzing the formation of free radicals.

Among the preferred hydrogen peroxide activators are the transition metals. The transition metals commonly include the elements in the d-block of the periodic table, including zinc, cadmium and mercury. The transition metals thus correspond to groups 3 to 12 in the periodic table. The transition metals therefore include the first transition series, comprising the elements Sc, Ti, V, Cr, Mn, Fe, Co, Ni, Cu, the second transition series, comprising the lanthanides, and the third transition series, comprising the actinides.

The transition metal hydrogen peroxide activators may be in the form of elemental metal, complexed metals or metal compounds. Preferred peroxygen activators include iron (Fe), titanium (Ti), manganese (Mn), silver (Ag) and transition metal compounds like manganese dioxide. Combinations of these activators, e.g., iron and copper, are also effective as peroxygen activators. Iron is a preferred hydrogen peroxide activator.

The hydrogen peroxide activator may be added to the aqueous hydrogen peroxide solution employed in this invention, in dissolved form or suspended form. The activator may also be introduced concurrently with the hydrogen peroxide into the alkali solution, such that the activator is in proximity of the hydrogen peroxide in the alkali solution and thus be effective as activator. The hydrogen peroxide activator is typically used in amounts well known to those skilled in the art of activating peroxygens. By way of example, the transition metal activator is typically added in an amount of about 0.1 to about 20% of the weight of the peroxide, but this amount can be increased or decreased outside of this range according to the actual circumstances (temperature, specific activator employed, etc.)

Alternatively or in addition, a peroxygen initiator may be already present in the sulfide-containing alkali solution being treated. For example, aqueous alkali solutions recovered from solution mining of subterranean trona or nahcolite ore deposits may contain components, e.g., iron or other transition metals, that are present as impurities or contaminants (via solubilization or leaching from the ore deposit or that were present in the solution mining solvent) but that nevertheless function as a peroxygen activator in the presence of subsequently-introduced hydrogen peroxide.

Treatment pH

The sulfide-containing aqueous alkali solutions treated according to the method of the present invention have an alkaline pH, i.e., a pH value in excess of 7. The pH value of the alkali solution may be in the range of greater than about 7 to about 13, but is more typically about 8 to about 12.

However, it is important to note that the precise pH value of the sulfide-containing alkali solutions is not a critical factor. The hydrogen peroxide treatment of this invention may be carried out without any adjustments being made to the relatively alkaline (i.e., pH>8) solution pH values normally encountered for these sulfide-containing aqueous alkali solutions.

The sulfide-containing alkali solutions treated in the method of this invention typically contain two significant alkali components, sodium carbonate ($Na_2CO_3$) and sodium bicarbonate ($NaHCO_3$), and the pH of such alkali solutions is influenced primarily by the amounts of these two alkali salts that are present in solution. Aqueous solutions containing only sodium carbonate have a pH of about 11, and solutions containing only sodium bicarbonate have a pH of about 8. The sulfide-containing alkali solutions of this invention typically have pH values that lie within these two pH values.

The presence of other seemingly minor components dissolved in the sulfide-containing alkali solutions also can impact the pH value of the solution. For example, the use of any aqueous mining solvent containing caustic soda (sodium hydroxide) as a reagent to recover trona ore values may cause the resulting alkali solution to have a highly alkaline pH value, e.g., a pH of about 11 to about 13, if unreacted solution mining reagent is present in the withdrawn alkali mining solution.

Hydrogen peroxide, the reactant utilized in the present invention, is typically very susceptible to decomposition in alkaline solutions, but the inventors have discovered that the hydrogen peroxide treatment of this invention may be carried out without any pH adjustment of the alkali solution. The reaction rate and reaction efficiency of the hydrogen peroxide reactant introduced into the sulfide-containing solutions being treated in the method of this invention are surprisingly high, notwithstanding the relatively alkaline pH of the alkali solutions.

Contrary to normal expectations in using hydrogen peroxide as a reactant in an alkaline environment, the hydrogen peroxide reactant in this invention provides rapid, efficient and targeted oxidation of the sulfide present in such alkaline solutions, without need for an excess of hydrogen peroxide reactant to compensate for peroxide decomposition in an alkaline medium.

Treatment Temperature

The temperature of the sulfide-containing aqueous alkali solution may vary over a wide range, as noted above in the discussion of alkali solutions, and the hydrogen peroxide treatment of this invention may be carried out without temperature adjustment of the alkali solution prior to treatment.

In general, special temperature adjustments of the alkali solution (e.g., a heating or cooling step) are not required as a prerequisite of the hydrogen peroxide treatment of this invention. The hydrogen peroxide oxidation reaction with sulfide in the alkali solution is relatively rapid and efficient, over the range of temperatures normally encountered for the sulfide-containing alkali solutions employed in this invention.

That being said, the reaction rate of the hydrogen peroxide oxidation in the sulfide treatment of this invention has been found to correlate directly with alkali solution temperature, with higher solution temperatures providing increased rate of peroxide reactivity, as shown by the data presented in Example 2 below.

In situations where the sulfide-containing alkali solution is subjected to further processing steps to effect recovery of its alkali values, e.g., as soda ash, such processing steps may include a heat transfer step or other unit operation in which the temperature of the alkali solution is adjusted. The hydrogen peroxide sulfide removal treatment of this invention is preferably carried out on a sulfide-containing solution at a higher temperature (rather than a lower temperature), wherever the option exists for treatment at either of two (or more) different alkali solution temperatures, particularly where the initial temperature of the alkali solution is less than about 15° C.

In the absence of a temperature adjustment, the sulfide-containing aqueous alkali solution treated with hydrogen peroxide can nevertheless still achieve very high sulfide removals by extension or increase of the reaction residence time (discussed below), even for alkali solution temperatures below 15° C.

The above-noted discussion about pH and temperature emphasizes an advantage of the present invention, i.e., its versatility in the treatment of sulfide-containing aqueous alkali solutions. The oxidation of the sulfide-containing alkali solutions with hydrogen peroxide in the present invention does not require adjustment of either the alkali solution pH or temperature from those parameter values typically encountered for alkali solutions obtained from outdoor holding or waste ponds or streams or from natural alkali or brine lakes or from operations to recover alkali mineral values via solution mining of subterranean ore deposits. As such, the sulfide removal method of this invention may be readily adapted to the treatment of such alkali solutions without major process modifications, e.g., solution pH adjustment or heat exchange operations.

Residence Time/Contact Time

The oxidation reaction of hydrogen peroxide with sulfide in the sulfide-containing aqueous alkali solution is relatively rapid, as noted earlier. Consequently, the residence time or contact time (for the hydrogen peroxide reactant in the treated alkali solution) required for achieving the desired completion of the oxidation reaction is normally not a critical factor in the treatment method of this invention.

The residence time required for completion of the oxidation reaction between the hydrogen peroxide and sulfide is very short, ranging from a few seconds to a few minutes at temperatures of about 20° C. or more. Reaction time data shown for Example 2 below indicate at elevated temperature (70° C.), the oxidation reaction was completed within a few seconds and at a solution temperature of 21° C. the oxidation reaction was completed within a few minutes, achieving a residual sulfide concentration of less than about 1 ppm sulfide.

The optimum residence time will normally depend on the temperature of the alkali solution being treated, the concentration of sulfide in the solution, the degree of sulfide removal desired (partial or essentially complete), and the like.

The residence time or contact time for the hydrogen peroxide treatment of the sulfide-containing aqueous alkali solution is preferably from about one minute to about thirty minutes, for alkali solution treatment temperatures of about 15° C. or more. For alkali solution treatment temperatures of less than about 15° C., the residence time for the hydrogen peroxide in contact with the sulfide-containing aqueous alkali solution is preferably at least tem minutes to about five hours, with progressively longer residence times being preferred as the treatment temperature is decreased below 10° C.

Efficiency of Sulfide Removal Via Hydrogen Peroxide Treatment

A particularly advantageous aspect of the present invention is that the hydrogen peroxide treatment is highly efficient at removing essentially all of the sulfide, e.g., achieving sulfide reductions of less than about 1 ppm $S^{-2}$, regardless of the initial concentration or level of sulfide contamination in the aqueous alkali solution. The method is equally efficient at removing, i.e., oxidizing, sulfide contents that are present in the aqueous alkali solutions at modest concentration levels, e.g., 3 ppm to 30 ppm $S^{-2}$, at moderate concentration levels, e.g., 30 ppm to 300 ppm $S^{-2}$, or at high concentration levels, e.g., 300 ppm to 1000 ppm $S^{-2}$ or more.

Even at high sulfide concentrations in sulfide-contaminated alkali solutions, the hydrogen peroxide treatment of the present invention is readily capable of reducing residual soluble sulfide to very low levels, e.g., less than about 10 ppm $S^{-2}$ or even less than about 5 ppm $S^{-2}$. Residual soluble sulfide concentrations of less than about 1 ppm $S^{-2}$ are also possible with alkali solutions containing high initial sulfide concentrations, provided that a sufficient amount of hydrogen peroxide is employed, e.g., at least about 2 moles (and preferably at least about 3 moles) of $H_2O_2$ per mole of soluble sulfide, and provided that good mixing is ensured of the hydrogen peroxide with the sulfide-containing alkali solution being treated.

This aspect of hydrogen peroxide treatment in this invention contrasts with other, prior art sulfide removal procedures, which are typically much less efficient, particularly at very high or very low sulfide concentrations, and which typically require use of an excess of the reactant employed to achieve high sulfide removals from the sulfide-containing solutions being treated.

The high reaction efficiency of the hydrogen peroxide in the present invention makes it especially suitable for ensuring that there will be minimal or essentially no hydrogen sulfide ($H_2S$) evolution in subsequent surface processing of sulfide-contaminated $Na_2CO_3$- and $NaHCO_3$-containing aqueous alkali solutions, to react or convert the bicarbonate content of the alkali solution to carbonate. This is particularly important where the byproduct $CO_2$ gas is recovered for reuse as a reactant, since the recovered $CO_2$ can be obtained essentially free of unwanted contaminants (aside from its water content), i.e., volatilized $H_2S$.

Introduction of Hydrogen Peroxide into Alkali Solution

The technique by which the hydrogen peroxide is introduced into the sulfide-containing alkali solution in the method of this invention, to provide the desired $H_2O_2$ concentration or desired amount of $H_2O_2$ dosing, is not critical. Introduction of the hydrogen peroxide is preferably carried out as a continuous addition but may alternatively be intermittent, e.g., slug dose addition.

Conventional mixing techniques and equipment may be used, the objective being to ensure uniform distribution of the hydrogen peroxide reactant throughout the sulfide-containing alkali solution. The hydrogen peroxide should be well distributed through the sulfide-containing solution, so good mixing and dispersal during the introduction of hydrogen peroxide into the alkali solution being treated are desirable.

The hydrogen peroxide may be added directly to the alkali solution or indirectly, via a side stream of alkali solution that is returned to main stream or body of alkali solution. This may be accomplished with inline mixing techniques, in which the hydrogen peroxide is introduced with good mixing and dispersal into an alkali solution flow stream, or via a separate mixing operation, in which the hydrogen peroxide is introduced into the alkali solution with mixing or stirring, in a conventional mixing tank or stirred holding tank.

Pretreatment of Sulfide in Alkali Solutions

The hydrogen peroxide treatment of this invention may optionally be employed as part of a multistep sulfide removal scheme, preferably as the final sulfide removal step to effect essentially complete removal of residual sulfide remaining in the alkali solution after the latter has been treated with a non-peroxide reagent in other procedures, to remove a portion of the sulfide.

Such a multistep sulfide removal procedure may be useful in situations where the sulfide concentration in the alkali solution is relatively high, e.g., more than about 50 ppm $S^{-2}$ or, more preferably, more than about 100 ppm $S^{-2}$. Such a multistep procedure provides several advantages. The initial sulfide reduction step can be carried out using sufficient non-peroxide reagent to remove a majority of the sulfide, without necessitating use of an excess of the reagent leading to an unwanted reagent overdose. Furthermore, the overall cost of sulfide removal may be less, as compared to use of hydrogen peroxide alone, for removal of high concentrations of sulfide in an alkali solution, since a less expensive reagent can be employed in the initial sulfide removal step.

The initial sulfide removal procedure may be accomplished by a sulfide precipitation step or sulfide oxidation step, or both. This initial step (or steps) is preferably sufficient to remove at least half of the sulfide concentration initially or originally present in the alkali solution. As an example of a sulfide precipitation procedure, the sulfide in the alkali solution may be reacted with ferrous iron, e.g., ferrous chloride ($FeCl_2$), to precipitate iron sulfide from solution. The iron sulfide precipitate is typically removed via settling and clarification or, alternatively, via filtration, optionally with the addition of a flocculating agent in the case of colloidal solids being present. As an example of a sulfide oxidation procedure, the sulfide in the alkali solution may be reacted with an oxidizing agent such as potassium permanganate, to convert the sulfide into elemental sulfur. The solids precipitated during the oxidation reaction are removed in a similar fashion, as with sulfide precipitation.

Alkali solutions from solution mining operations are typically subjected to settling and or clarification to remove suspended solids, before further processing (e.g., crystallization or the like), and such settling or clarification operations may also be utilized to remove at least some of the solid products or byproducts of any initial sulfide removal procedure that may also be carried out.

There are several disadvantages of sulfide precipitation (e.g., with ferrous iron) or sulfide oxidation (e.g., with potassium permanganate) where these procedures are considered for use as a sole means of sulfide removal: (i) essentially complete removal of sulfide (<1 ppm $S^{-2}$) is difficult to achieve, unless an excess of reagent is employed; (ii) separation of the sulfide-containing precipitate or oxidation product or byproducts may require additional (more expensive) solids separation steps, if the precipitated solids are not easily separated from the alkali solution; and (iii) the alkali solution may contain dissolved unreacted reactant, e.g., ferrous iron in the case of ferrous chloride being used as a reactant or permanganate in the case of this oxidizing agent being employed, or may contain reactant byproducts, and such dissolved unreacted reactant represents introduction of yet another potentially contaminating species into the alkali solution.

In view of these drawbacks to such supplemental or alternative sulfide removal techniques, the sulfide removal method of this invention, using hydrogen peroxide as the sulfide oxidizing agent, is usually preferred as the sole or only sulfide removal method employed for treating sulfide-containing aqueous alkali solutions.

Process Implementation—Conversion of Sodium Bicarbonate in Alkali Solutions

The sulfide control method of the present invention may be implemented in a relatively simple and straightforward manner, particularly in existing alkali solution processing plants that are retrofitted to provide for sulfide control. The operational simplicity of the hydrogen peroxide treatment in the method of the present invention is very advantageous in adapting the sulfide control method of this invention to existing facilities that process aqueous alkali solutions for recovery of their alkali values, e.g., as soda ash or sodium bicarbonate.

Many conventional alkali processing operations involve a unit operation or step to remove suspended solids in the alkali solution as an initial processing step, e.g., prior to crystallization of $Na_2CO_3$ values or $NaHCO_3$ values from the alkali solution. Such a solids removal or solids reduction step may be carried out via clarification (in a clarifier), settling/clarification (in settler-clarifier equipment), or filtration (in filtration equipment). The solids removal-reduction may also involve flocculation and use of a flocculant, to facilitate separation of the suspended solids from the alkali solution (i.e., alkali liquor).

The hydrogen peroxide treatment of this invention is preferably carried out on the sulfide-containing alkali solution after the solution has been processed in such a solids-removal or solids-reduction step, since any potential interference from such solids or side reactions with such solids is minimized by treating the solids-depleted alkali solution with hydrogen peroxide.

Sulfide-containing aqueous alkali solutions containing $NaHCO_3$ and $Na_2CO_3$ suitable for treatment in the method of this invention are often processed further to recover the dissolved alkali values, e.g., particularly as soda ash (sodium carbonate). Such processing often involves steps or unit operations in which at least a portion of the bicarbonate content of the alkali solution is converted or decomposed to carbonate. This bicarbonate-to-carbonate conversion, also referred to as bicarbonate decomposition, serves to enhance downstream crystallization recoveries of $Na_2CO_3$-containing crystalline species and minimize the likelihood of co-crystallization of $NaHCO_3$-containing crystalline species.

Such $Na_2CO_3$-enriched aqueous alkali solutions are typically subjected to one or more crystallization steps in which the $Na_2CO_3$ values are crystallized as a single sodium carbonate species, preferably selected from the group consisting of sodium carbonate monohydrate, sodium carbonate decahydrate, sodium sesquicarbonate and anhydrous sodium carbonate. Sodium carbonate monohydrate is the most preferred crystalline product, and the sodium carbonate monohydrate is typically recovered and calcined to make a dense soda ash product. Sodium carbonate decahydrate is another preferred crystalline product, but the crystallized decahydrate is typically recovered as an intermediate product and recrystallized as sodium carbonate monohydrate.

Conversion of bicarbonate to carbonate to produce a $Na_2CO_3$-enriched aqueous alkali solution may be effected via steam stripping of the $NaHCO_3$- and $Na_2CO_3$-containing aqueous alkali solution or by evaporation of the alkali solution or by heating the alkali solution or by combinations of these, e.g., heating the alkali solution before subjecting it to evaporation. These bicarbonate conversion or decomposition techniques result in the removal of water vapor ($H_2O$) and carbon dioxide gas ($CO_2$) from the aqueous alkali solution, as byproducts of the bicarbonate-to-carbonate conversion or decomposition reaction. The disclosures of U.S. Pat. No. 5,283,054 and No. 6,022,516, both of Copenhafer et al., are hereby incorporated by reference for their teachings concerning the decomposition of bicarbonate in aqueous alkaline brines.

Such processing of aqueous alkali solutions that also contain sulfide has the drawback of causing or resulting in the concurrent release or evolution of hydrogen sulfide gas ($H_2S$) from the soluble but readily-volatilized sulfide present in the alkali solution. The presence of hydrogen sulfide in the evolved carbon dioxide constitutes a contaminant, which must normally be removed if the carbon dioxide is to be recovered for reuse as a reactant or if the evolved gas is to be released into the atmosphere.

The method of the present invention provides a straightforward means for minimizing or completely avoiding the problematic evolution of gaseous hydrogen sulfide during processing of sulfide-containing alkali solutions to produce $Na_2CO_3$-enriched aqueous alkali solutions, suitable for recovery of their $Na_2CO_3$ values. As described above, the hydrogen peroxide treatment method of this invention is readily capable of removing essentially all soluble sulfide from sulfide-containing aqueous alkali solutions also containing $Na_2CO_3$ and $NaHCO_3$. The method of the present invention converts the soluble sulfide to soluble, non-volatilizable species (i.e., non $H_2S$-forming species) that remain in the treated alkali solution, even when the solution is subsequently processed to decompose its sodium bicarbonate content into soluble sodium carbonate, with concurrent release of gaseous carbon dioxide.

A preferred embodiment of the present invention is a method for processing an aqueous alkali solution contaminated with sulfide, in a multistep procedure. First, hydrogen peroxide is introduced into a sulfide-containing aqueous alkali solution that also contains $NaHCO_3$ and $Na_2CO_3$, to effect a significant reduction in the concentration of the dissolved sulfide. The $H_2O_2$ treatment is preferably sufficient to reduce the sulfide in the treated alkali solution by at least about 50%, more preferably by at least 70% and most preferably by at least 90% of its initial sulfide concentration. The $H_2O_2$-treated alkali solution preferably contains less than about 10 ppm sulfide, more preferably less than about 5 ppm sulfide, and most preferably less than about 1 ppm sulfide.

Next in the multistep operation, bicarbonate in the sulfide-depleted alkali solution is decomposed to form $Na_2CO_3$, with concurrent evolution of gaseous carbon dioxide. The bicarbonate decomposition is preferably effected by steam stripping or evaporation or heating (or a combination of these operations) of the sulfide-depleted $NaHCO_3$- and $Na_2CO_3$-containing alkali solution.

The evolved carbon dioxide gas preferably contains less than about 500 ppmw (parts per million by weight) $H_2S$, more preferably less than about 100 ppmw $H_2S$, and most preferably less than about 10 ppmw $H_2S$. Depending on the intended use or disposition of the evolved carbon dioxide gas, a further $H_2S$ polishing step (e.g., using activated carbon or iron sponge) may optionally be carried out to remove residual $H_2S$ concentrations that may be present in the carbon dioxide gas stream.

Finally in the multistep operation, $Na_2CO_3$ values in the sulfide-depleted $Na_2CO_3$-enriched alkali solution are recovered via a crystallization operation. The $Na_2CO_3$ values recovered from the $Na_2CO_3$-enriched alkali solution may be crystallized as a single sodium carbonate species, and the crystalline product is preferably selected from the group consisting of sodium carbonate monohydrate, sodium carbonate decahydrate, sodium sesquicarbonate and anhydrous sodium carbonate.

The multistep operation described above preferably includes a solids-removal or solids reduction step in which the sulfide-containing aqueous alkali solution is processed to remove suspended solids, and the solids-depleted sulfide-containing alkali solution is then treated with hydrogen peroxide in the method of the invention.

The following non-limiting Examples illustrate preferred embodiments of the present invention.

EXAMPLES

Example 1

This Example 1 describes the treatment of sulfide-containing alkali mining solution (mine water obtained from the solution mining of trona) using various amounts of hydrogen peroxide to evaluate the effectiveness of the hydrogen peroxide treatment at different dosage levels.

The alkali mining solution was clarified mine water obtained from a solution mining operation recovering sodium carbonate values from a trona deposit located at Green River, Wyo. The mine water contained about 14 wt % $Na_2CO_3$ and about 4.5 wt % $NaHCO_3$ (not analyzed) and about 100 ppm total organic carbon (TOC) and less than 0.1 ppm iron (Fe) in solution, as well as some dissolved sodium sulfate and sodium chloride (not analyzed). Prior to its use in this laboratory-scale study, the mine water had been subjected to a clarification operation to remove suspended solids. The alkali mining solution had a pH of about 11.

Although the alkali mining solution had originally contained sulfide when withdrawn from the solution mining operation, there was no detectable sulfide in the alkali solution when these studies were initiated. The sulfide was believed to have become volatilized from the alkali solution during transport and storage, before these studies were initiated.

In a first study, the alkali mining solution was dosed with sufficient sodium sulfide ($Na_2S$) to provide 107 ppm sulfide ($S^{-2}$) in the solution, a sulfide concentration representative of sulfide-contaminated alkali mining solutions recovered at other times from the same trona solution mining operation. Previous analyses of solution mining liquor from this same operation had indicated sulfide contents in the as-recovered mining solution ranging from 73 ppm $S^{-2}$ to 114 $S^{-2}$. The alkali mining solution was at a temperature of 22° C., when the solution was treated with aqueous hydrogen peroxide. The sulfide-containing aqueous mining solution was divided into six aliquots for this first study.

A range of different dosages of hydrogen peroxide were employed in this study, ranging from 0.48 moles $H_2O_2$ per mole sulfide to 5.63 moles $H_2O_2$ per mole sulfide in the alkali mining solution. The aqueous hydrogen peroxide employed in this Example 1 was diluted with water to a 1 wt % $H_2O_2$ concentration, since relatively small amounts of $H_2O_2$ were required for treatment of the sulfide present in the alkali mining solution.

The dilute 1 wt % hydrogen peroxide solution was added with stirring to each of the six aliquots of alkali mining solution containing 107 ppm $S^{-2}$, and the $H_2O_2$-treated alkali solution was analyzed for sulfide content after thirty minutes. Reaction progress for the hydrogen peroxide treatment was not measured in this Example, but the actual reaction time was believed to be relatively fast, e.g., less than 5 minutes, based on the results obtained and reported for Example 2.

Results of this first study for Example 1 are shown in Table 1 below, which notes moles $H_2O_2$ added per mole sulfide, sulfide concentration in the alkali solution (measured 30 minutes after peroxide addition), moles sulfide oxidized per mole $H_2O_2$ added and percentage of sulfide oxidized (based on the initial 107 ppm sulfide present). A baseline analysis was carried out on another aliquot of alkali solution which was not treated with hydrogen peroxide, and these data are shown in the first line of Table 1.

TABLE 1

| Moles $H_2O_2$ Added Per Mole Sulfide | $S^{-2}$ (ppm) | Moles Sulfide Oxidized per Mole $H_2O_2$ | Sulfide Oxidized (%) |
|---|---|---|---|
| 0 | 107 | 0 | 0 |
| 0.48 | 68 | 0.75 | 36.3 |
| 0.95 | 43 | 0.62 | 59.2 |
| 1.88 | 0.9 | 0.53 | 99.2 |
| 2.82 | 0.0 | 0.35 | 100.0 |
| 3.76 | 0.2 | 0.27 | 99.8 |
| 5.63 | 0.3 | 0.18 | 99.7 |

The results shown in Table 1 are also depicted in graphical form in FIG. 1. FIG. 1 shows the sulfide reductions achieved in the $H_2O_2$-treated alkali solution (measured both as ppm $S^{-2}$ and as moles $S^{-2}$ oxidized per mole $H_2O_2$) plotted against the amounts of hydrogen peroxide added (moles $H_2O_2$ per mole $S^{-2}$).

It should be noted that the sulfide concentrations reported in Table 1 are "raw" analyses, uncorrected for the slight dilution factor resulting from addition of dilute 1 wt % $H_2O_2$, but this correction only amounts to about 6% at the highest peroxide amount used. The values reported for Sulfide Oxidized (%) in the last column of Table 1, however, are corrected for the dilution factor.

As shown by the data in Table 1, only 1.88 moles $H_2O_2$ per mole sulfide were required to effect essentially complete removal of the sulfide content (<1 ppm $S^{-2}$) in the $H_2O_2$-treated alkali solution. This amount is significantly less than the theoretical stoichiometric requirement of 4 moles $H_2O_2$ required to react one mole of sulfide ($S^{-2}$) to sulfate ($SO_4^{-2}$).

In a second similar study, alkali mining solution that was clarified mining solution identical to that used in the first study was dosed with sufficient sodium sulfide to provide 109 ppm sulfide ($S^{-2}$) in the solution. The alkali mining solution was again at a temperature of 22° C. during the aqueous hydrogen peroxide addition and was again divided into six aliquots of the 109 ppm $S^{-2}$ alkali mining solution for this second study.

The hydrogen peroxide concentration was again diluted to a concentration of 1 wt % $H_2O_2$ for use in this second study. Several different dosages of hydrogen peroxide were employed in this second study, ranging from 0.59 moles $H_2O_2$ per mole sulfide to 3.45 moles $H_2O_2$ per mole sulfide in the treated alkali solution.

The dilute 1 wt % hydrogen peroxide solution was added with stirring to the $S^{-2}$-containing alkali mining solution, and the $H_2O_2$-treated alkali solution was analyzed for sulfide content after thirty minutes.

Results of this second study for Example 1 are shown in Table 2 below, which notes moles $H_2O_2$ added per mole sulfide, sulfide concentration in the alkali solution (measured 30 minutes after peroxide addition), moles sulfide oxidized per mole $H_2O_2$ added, percentage of sulfide oxidized (based on the initial 107 ppm sulfide present) and total organic carbon (TOC) analyzed in the treated solution. A baseline analysis was again carried out on another aliquot of the sulfide-containing alkali mining solution which was not treated with hydrogen peroxide, and these data are shown in the first line of Table 2.

TABLE 2

| Moles $H_2O_2$ Added Per Mole Sulfide | $S^{-2}$ (ppm) | Moles Sulfide Oxidized per Mole $H_2O_2$ | Sulfide Oxidized (%) | TOC (ppm) |
|---|---|---|---|---|
| 0 | 109 | 0 | 0 | 106 |
| 0.59 | 61 | 0.75 | 36.3 | 104 |
| 1.16 | 28 | 0.62 | 59.2 | 103 |
| 1.74 | 0.6 | 0.53 | 99.2 | 102 |
| 2.29 | 0.2 | 0.35 | 100.0 | 104 |
| 2.89 | 0.2 | 0.27 | 99.8 | 100 |
| 3.45 | 0.1 | 0.18 | 99.7 | 101 |

Figure 2:
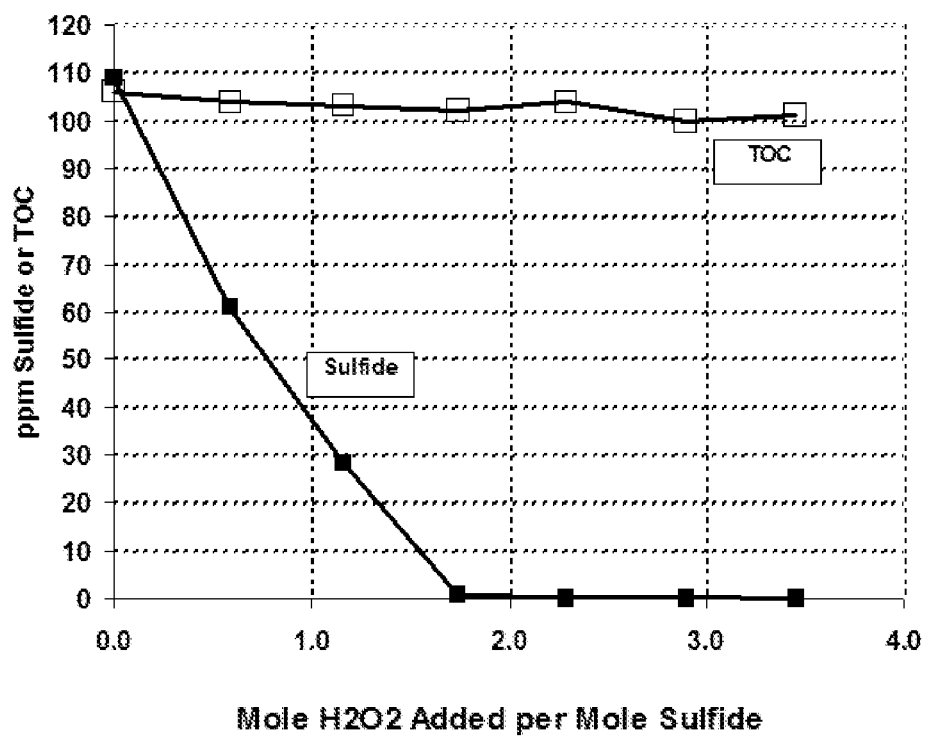
FIG. 2 shows in graphical form the results of a second study described in Example 1, in which varying amounts of hydrogen peroxide were used to treat a sulfide-containing alkali mining solution. The sulfide reductions achieved in the $H_2O_2$-treated alkali solution (measured as ppm $S^{-2}$) and total organic carbon content (measured as ppm TOC) of the solution are plotted against the amounts of hydrogen peroxide added (moles $H_2O_2$ per mole $S^{-2}$).

The results shown in Table 2 are also depicted in graphical form in FIG. 2. FIG. 2 shows the sulfide reductions achieved in the $H_2O_2$-treated alkali solution (measured as ppm $S^{-2}$) and total organic carbon content (measured as ppm TOC) of the solution plotted against the amounts of hydrogen peroxide added (moles $H_2O_2$ per mole $S^{-2}$).

The sulfide and TOC concentrations reported in Table 2 are "raw" analyses, uncorrected for the slight dilution factor resulting from addition of dilute 1 wt % $H_2O_2$, but this correction only amounts to about 4% at the highest peroxide amount used. The values reported for Sulfide Oxidized (%) in the last column of Table 2, however, are corrected for the dilution factor.

As shown by the data in Table 2, only 1.74 moles $H_2O_2$ per mole sulfide were sufficient to effect essentially complete removal of the sulfide content (<1 ppm $S^{-2}$) in the $H_2O_2$-treated alkali solution, consistent with the results obtained in the first study.

The TOC data in the last column of Table 2 demonstrate another surprising aspect of the hydrogen peroxide treatment. Essentially complete removal of sulfide was effected with hydrogen peroxide in excess of the above-noted threshold amount (1.74 moles $H_2O_2$ per mole $S^{-2}$), and yet the total organic carbon remained relatively unchanged at about 100 ppm TOC, i.e., the dissolved TOC content remained unreacted, even when a significant excess of hydrogen peroxide was employed.

In addition, there was no visual evidence of solid sulfide-oxidation products being precipitated or formed (e.g., colloidal sulfur), even when a significant excess of hydrogen peroxide was used beyond the minimum threshold amount needed for essentially complete removal of sulfide in the two studies of this Example 1 (see last two data lines of Tables 1 and 2).

Thus, inadvertent or deliberate use of an excess of hydrogen peroxide, in the sulfide treatment method of this invention, does not introduce the complication of an unwanted solid byproducts formation. Likewise, unreacted hydrogen peroxide reactant itself, if present in the treated alkali solution, does not introduce an undesirable species into the treated alkali solution and is likely to be quickly decomposed into innocuous reaction products in the alkaline pH environment of the alkaline solution.

Example 2

This Example 2 describes the treatment of sulfide-containing alkali mining solution using hydrogen peroxide, using two different treatment temperatures, 21° C. and 70° C., to demonstrate the effect of solution temperature on the reaction time required for sulfide removal via the hydrogen peroxide treatment.

In the hydrogen peroxide treatment for sulfide removal, a first study was carried out at a solution temperature of 21° C., and a second study was carried out on alkali solution heated to 70° C. The hydrogen peroxide concentration was again 1 wt % $H_2O_2$, as was used in Example 1.

Sufficient hydrogen peroxide was introduced, with stirring, into the sulfide-containing mining solution containing 36 ppm $S^{-2}$ to provide a peroxide to sulfide mole ratio of 2.3:1 $H_2O_2:S^{-2}$. This amount of hydrogen peroxide provided a slight excess (22-32%) of hydrogen peroxide required for complete reaction of the sulfide, as compared with the 1.74-1.88 $H_2O_2:S^{-2}$ mole ratios in Example 1 that yielded essentially complete reaction of the sulfide present in the alkali mining solution.

After addition of the hydrogen peroxide with stirring, sulfide analyses were performed on samples removed at periodic intervals to monitor the progress or completion of the sulfide removal. In the first trial at 21° C., samples of the alkali solution were taken at 30, 60, 120 and 300 seconds after the $H_2O_2$ addition and analyzed for sulfide content. In the second trial at 70° C., samples of the alkali solution were taken at 5, 30 and 60 seconds after the $H_2O_2$ addition and analyzed for sulfide content.

Figure 3:
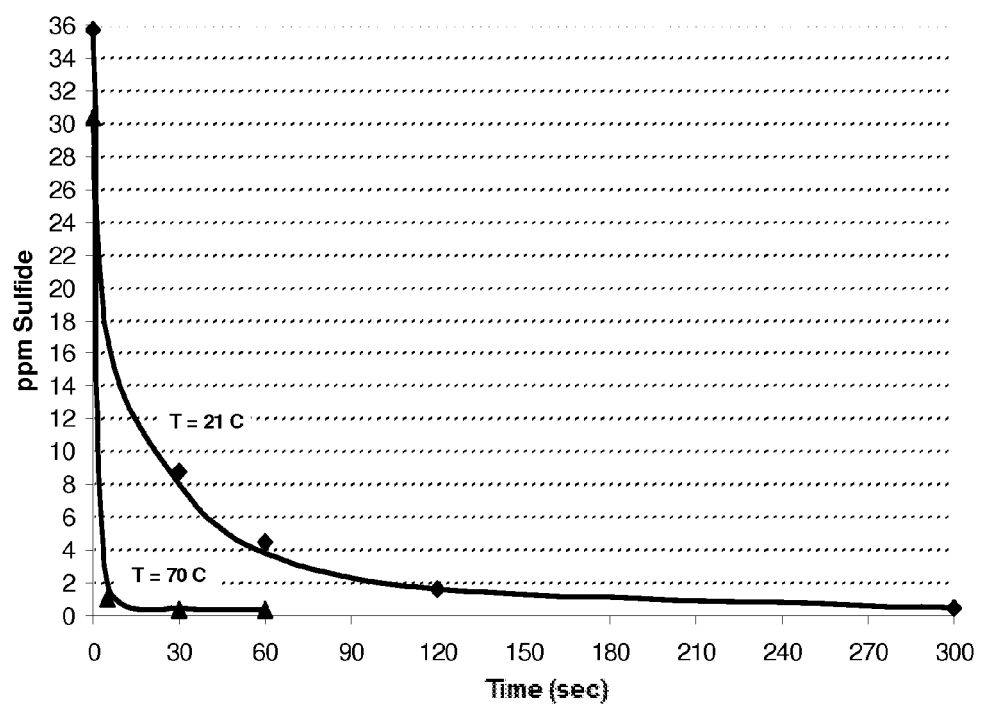
FIG. 3 shows in graphical form the results of studies described in Example 2, in which the reaction progress was monitored for hydrogen peroxide treatment in a sulfide-containing alkali mining solution, at two different temperatures. The reduction in sulfide content in the $H_2O_2$-treated alkali solution is plotted against time elapsed from the introduction of hydrogen peroxide into the solution.

Results of these studies for Example 2 are shown graphically in FIG. 3, in which sulfide concentration (ppm $S^{-2}$) in the analyzed alkali mining solution, on the vertical axis are plotted against time (seconds) elapsed from the $H_2O_2$ addition, on the horizontal axis.

The graphical results in FIG. 3 show that for alkali mining solution at T=21° C., removal of the sulfide was relatively fast, with about 75% of the initial $S^{-2}$ content being reacted after 30 seconds and nearly 90% of the initial $S^{-2}$ content being reacted after 60 seconds. At 120 seconds (2 minutes), the sulfide concentration was reduced below 2 ppm $S^{-2}$. At 300 seconds (5 minutes), the sulfide in the $H_2O_2$-treated alkali solution was essentially completely reacted, being reduced to less than 1 ppm $S^{-2}$.

The results obtained at the higher solution treatment temperature of 70° C. are even more dramatic. The graphical results in FIG. 3 show that after only 5 seconds (after $H_2O_2$ addition), the sulfide in the $H_2O_2$-treated alkali solution was essentially completely reacted, being reduced to less than 1 ppm $S^{-2}$.

It should be noted that the excellent sulfide removal results obtained at these two temperatures were achieved (as also in Example 1) with hydrogen peroxide alone, without the addition of a transition metal, sometimes used to improve the reactant ($H_2O_2$) utilization and shorten reaction times.

Example 3

This Example 3 illustrates another embodiment of the present invention, in which the sulfide-containing alkali mining solution is treated for sulfide removal in a two step process in which the second step involves treatment with hydrogen peroxide. The initial step effects removal of a portion of the sulfide content, using ferrous iron (as $FeCl_2$) to precipitate sulfide. This initial partial sulfide removal step is then followed by treatment of the alkali mining solution with aqueous hydrogen peroxide, using the procedure described in Example 2.

In the initial sulfide treatment using ferrous iron, the mine water was identical to that used in Example 1, being clarified alkali solution obtained from a trona solution mining operation. Clarified alkali mining solution was dosed with sufficient sodium sulfide to provide about 80 ppm sulfide ($S^{-2}$) in the solution.

The sulfide-containing alkali solution, at a temperature of 22° C., was then subjected to the preliminary sulfide removal step, by introducing $FeCl_2$ into the solution to provide a ratio of 0.44 mole $Fe^{+2}$ per mole $S^{-2}$ to precipitate a portion of its initial sulfide content. Settling of the precipitated solids was assisted by the addition of 250 ppm flocculating agent. The resulting alkali mining solution was analyzed after 3 hours settling time and was determined to contain 34 ppm $S^{-2}$, indicating that slightly more than half of the initial sulfide content had been removed, and 2.7 ppm $Fe^{+2}$ (as compared to <0.1 ppm $Fe^{+2}$ in the untreated mining solution).

The treated alkali mining solution, containing 34 ppm $S^{-2}$ after the initial treatment with ferrous iron, may then be treated as described in Example 2, to remove the remaining sulfide using hydrogen peroxide. Such treatment with hydrogen peroxide, used at a concentration of 1 wt % $H_2O_2$ and at a mole ratio of 2.3:1 $H_2O_2:S^{-2}$ is sufficient to provide essentially complete removal of the remaining sulfide, to less than about 1 ppm $S^{-2}$, with only five minutes residence time at a treatment temperature of 21° C.

The two step sulfide removal procedure described in this Example 3 has the advantage of requiring significantly less hydrogen peroxide than would otherwise be required for sulfide removal of the original 80 ppm sulfide ($S^{-2}$) in the aqueous mining solution, since the two step procedure uses an amount of hydrogen peroxide sufficient to remove ~34 ppm sulfide, rather than an amount required to remove ~80 ppm sulfide from the aqueous mining solution.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method for removing sulfide from an aqueous alkali solution comprising
introducing a reagent consisting essentially of aqueous hydrogen peroxide into a sulfide-containing aqueous alkali solution obtained from an alkali mineral recovery operation to oxidize soluble sulfide in the aqueous alkali solution to a soluble reaction product and form a sulfide-depleted aqueous alkali solution.

2. The method of claim 1 wherein the sulfide-containing aqueous alkali solution contains an alkali selected from the group consisting of $Na_2CO_3$, $NaHCO_3$, and mixtures of $Na_2CO_3$ and $NaHCO_3$.

3. The method of claim 2 wherein the sulfide-containing aqueous alkali solution is obtained from a source selected from the group consisting of trona solution mining liquor, nahcolite solution mining liquor, trona mechanical mining waste water, alkali solution surface holding ponds and natural brine lakes.

4. The method of claim 1 wherein the introduced hydrogen peroxide is aqueous hydrogen peroxide containing about 1 wt % $H_2O_2$ to about 50 wt % $H_2O_2$.

5. The method of claim 1 wherein the hydrogen peroxide is introduced via in situ formation from a hydrogen peroxide-generating compound.

6. The method of claim 1 wherein the amount of hydrogen peroxide introduced into the sulfide-containing aqueous alkali solution provides at least about 2 moles $H_2O_2$ per mole of soluble sulfide present in the sulfide-containing alkali solution.

7. The method of claim 6 wherein the amount of hydrogen peroxide introduced into the sulfide-containing aqueous alkali solution provides less than about 4 moles $H_2O_2$ per mole of soluble sulfide present in the sulfide-containing alkali solution.

8. The method of claim 1 wherein the sulfide-containing aqueous alkali solution contains at least about 3 ppm soluble sulfide.

9. The method of claim 1 wherein the sulfide-containing alkali solution contains at least about 20 ppm soluble sulfide and the amount of hydrogen peroxide introduced is sufficient to reduce the content of soluble sulfide to less than about 10 ppm sulfide.

10. The method of claim 1 wherein the sulfide-containing alkali solution contains at least about 10 ppm soluble sulfide and the amount of hydrogen peroxide introduced is sufficient to reduce the content of soluble sulfide to less than about 5 ppm sulfide.

11. The method of claim 1 wherein the amount of hydrogen peroxide introduced is sufficient to reduce the content of soluble sulfide to less than about 1 ppm sulfide.

* * * * *